United States Patent [19]

Kobayashi et al.

[11] Patent Number: 4,646,170

[45] Date of Patent: Feb. 24, 1987

[54] METHOD AND APPARATUS FOR RECORDING AND REPRODUCING A DIGITAL SIGNAL WITH A STATIONARY HEAD

[75] Inventors: Masaharu Kobayashi; Hiroo Okamoto; Takao Arai, all of Yokohama, Japan

[73] Assignee: Hitachi, Ltd., Tokyo, Japan

[21] Appl. No.: 757,448

[22] Filed: Jul. 22, 1985

[30] Foreign Application Priority Data

Jul. 23, 1984 [JP] Japan ................................ 59-151210

[51] Int. Cl.[4] .......................... G11B 5/02; G11B 5/09; G06F 11/10
[52] U.S. Cl. ...................................... 360/22; 360/32; 360/39; 360/48; 371/38; 371/39
[58] Field of Search ...................... 371/38, 39; 360/22, 360/38.1, 32, 39, 48, 63, 23

[56] References Cited

U.S. PATENT DOCUMENTS

| | | | |
|---|---|---|---|
| 4,211,997 | 7/1980 | Rudnick et al. | 371/38 |
| 4,224,642 | 9/1980 | Mawatari et al. | 360/22 X |
| 4,277,807 | 7/1981 | Baldwin | 360/48 X |
| 4,380,071 | 4/1983 | Odaka | 360/38.1 X |
| 4,413,340 | 11/1983 | Odaka et al. | 371/39 |
| 4,451,920 | 5/1984 | Hoshimi et al. | 360/38.1 X |
| 4,453,250 | 6/1984 | Hoshimi et al. | 360/38.1 X |
| 4,539,605 | 9/1985 | Hoshino et al. | 360/48 X |
| 4,541,093 | 9/1985 | Furuya et al. | 371/38 X |

OTHER PUBLICATIONS

Multitrack Digital Audio Recorder for Consumer Application by Van Gestel et al., J. Audio Engg. Society, vol. 30, No. 12, Dec. 1982.
On PCM Multi Channel Tape Recorder Using Powerful Code Format by Tanaka et al., Audio Engg. Society 67th Convention Oct. 1980.

Primary Examiner—Raymond F. Cardillo
Assistant Examiner—Alyssa H. Bowler
Attorney, Agent, or Firm—Antonelli, Terry & Wands

[57] ABSTRACT

In a stationary head type PCM recorder having an A/D converter for sampling an analog signal and converting the analog signal to a digital signal, a signal processing circuit including data delay means for adding an error detection and correction code and a predetermined signal to the digital signal for each error correction group of a predetermined number of samples, and a multi-track head for recording an output of the signal processing circuit on a plurality of tracks of a magnetic record medium and reproducing the signals recorded on the magnetic record medium; incorrectability of the error detection and correction code for a burst error in the output analog signal due to a burst error in the reproduced output is reduced by delaying parity data by the error detection and correction code and the digital signal data by different delay times such that the digital signal data are dispersely recorded in a track direction and a tape transport direction, and allotting the delayed data to the multi-track head such that the data of the adjacent sample points are spaced from each other by at least the distribution length of the parity data and the parity data is arranged between the distributed adjacent data.

9 Claims, 12 Drawing Figures

FIG. 4C  BLOCK CONFIGURATION

$C_I$ — DECODING

FIG. 6
C2 – DECODING

FIG. 7

FIG. 8
BURST ERROR CORRECTION
AND CONCEALMENT CAPABILITY
(20 TRACK)

FIG. 9

FIG. 10

METHOD AND APPARATUS FOR RECORDING AND REPRODUCING A DIGITAL SIGNAL WITH A STATIONARY HEAD

BACKGROUND OF THE INVENTION

The present invention relates to recording and reproducing technique on a digital audio tape by a stationary head, and more particularly to method and apparatus suitable for correcting and concealing a data error such as a dropout in a record medium.

A multi-track, Stationary-head Digital tape recording/reproducing apparatus Audio Tape-recorder (S-DAT) has been well known in the art of digital audio system.

Figure 2:
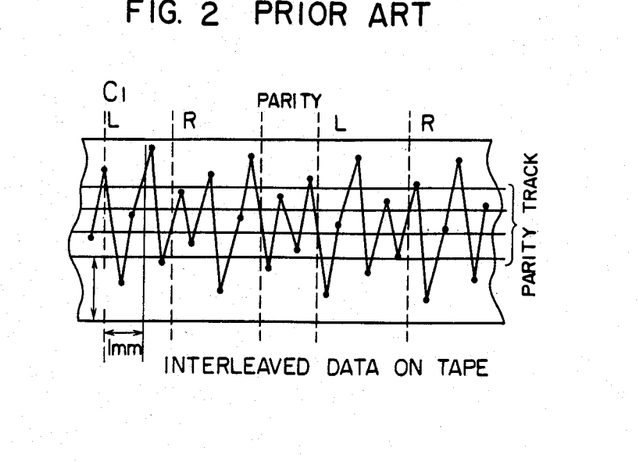
FIG. 2 illustrates data arrangement on a tape in prior art.

Many audio data recording formats have been proposed to prevent or correct data errors in recording and reproducing the data. As an example, an interleaved format is shown in an article entitled "Stationary Head Digital Audio Tape Deck" by Uchida et al, Technical Report of Institute of Electronics and Electrical Communication of Japan, Vol. 81, EA 81-64, p. 38 (1981). In the disclosed audio recording/reproducing method, a CIRC (cross-interleaved Reed Solomon code) is used to correct the data error. By nature of a magnetic tape, a burst error which is much longer than a bit length, that is, a data dropout frequently occurs. Accordingly, the data is interleaved to convert the burst error to a random error. FIG. 2 shows an interleaved data in the above system. The interleaved data is arranged in a parity track located at a center of the tape and a data signal track located at an edge are of the tape. Twelve words (1 word=16 bits, one sampling data) of left (L) and right (R) channels sampled from a two-channel stereo signal are represented by 24 symbols (1 symbol=8 bits, error correction unit) to which 4 parity symbols are added to form 28 symbols, which is arranged on the tape. After the interleave, four parity symbols are further added on the tape to form a 32-symbol data. The correction is made in two steps for the widthwise data and the interleaved 28-symbol data. Up to four symbol errors can be corrected by an erasure correction method. In this system, a correction length is approximately 2.1 mm and an interpolation length is approximately 5 mm. However, no consideration was made in this system to a low error rate at the edge of the tape and a long burst error generated in one of the tracks.

An article entitled "On PCM Multi-Channel Tape Recorder using Powerful Code Format" by K. Tanaka et al, presented at the 67th Convention of the Audio Engineering Society (AES), October 31–Nov. 3, 1980 New York, discloses development of a semi-separate code format. Particularly, FIG. 7 thereof shows a format of odd/even sample data interleaved by a skew pattern with respect to a tape transport direction.

An article entitled "A Multitrack Digital Audio Recorder for Consumer Applications by W. J. Van Gestel et al, in J. AES, vol. 30, No. 12, 1982, December pp. 889–895, presented at the 70th Convention of the AES, New York, October 30–Nov. 2, 1981, particularly FIG. 9 and page 892 disclose a record format on a tape in which the distance between data words terminates in each block and parity check words are added in the block longitudinally and widthwise of the tape.

This error correction technique for correcting the random and burst errors is not sufficient to prevent and correct the data dropout in recording and reproducing the two-channel audio signal on the tape.

The technical trend of the S-DAT is described in the article entitled "Activities of DAT Association", ELECTRONICS published by Electronic Industries Association of Japan, vol. 24, No. 10, 1984, pp. 36–42, particularly pp. 40–42.

SUMMARY OF THE INVENTION

It is an object of the present invention to provide a stationary head digital audio tape recording and reproducing system which resolves the problems encountered in the prior art stationary head digital audio tape recording and reproducing system and can reproduce an analog signal which is sufficient for practical use even if dropouts occurs in the track width direction and travel direction of the tape.

It is another object of the present invention to provide a stationary head digital recording method and apparatus having a tape recording format of a high error correction capability for a burst error in converting a multi-channel audio signal to a digital signal and recording it on a multi-track tape.

In one aspect of the present invention, odd data and even data of two sampled channels, that is, sample data adjacent to each other are separated from each other longitudinally of the tape, and an error detecting and correcting parity data generated from the odd and even data is inserted between those channels, and the parity data is arranged in a track on a tape edge.

In another aspect of the present invention, each track on a tape includes L-channel data and R-channel data. Accordingly, if a burst error occurs within the track, error data is distributed to both channels. The parity data is arranged in the track on the edge of the tape where errors frequently occur and the audio data is arranged in inner tracks where the occurrence of errors is relatively low. The data at the odd sample points and the data at the even sample points of the audio data are separated and the parity data is inserted therebetween so that the error concealment capability with respect to the burst error is enhanced.

A delay of the parity data is set to be larger than a delay of the audio data to prevent the reduction of the burst error correction capability due to the concentrated arrangement of the parity data.

DESCRIPTION OF THE PREFERRED EMBODIMENTS

One example of the S-DAT is described in U.S. patent application Ser. No. 416,244 by Hoshino et al filed on Sept. 9, 1982, entitled "A PCM Tape recording and Reproducing Apparatus Having a Dropout-Immune Data Recording Format", now U.S. Pat. No. 4,539,605, issued Sept. 3, 1985 which corresponds to Japanese Patent Application No. 56-142292 and European Patent Application No. 82108375.5 filed on Sept. 10, 1982.

In a multi-track PCM recorder, PCM data is recorded on a plurality of tracks, e.g. 20 tracks. Left and right time-serial audio signals $L_{in}$ and $R_{in}$ from the two-channel audio signal source are alternately selected by a channel selection circuit MPX, and they are time-division multiplexed as left and right sample signals in the order of $L_0$, $R_0$, $L_1$, $R_1$, $L_2$, $R_2$, ..., which are then transmitted as a serial signal. The analog signal from the channel selection circuit MPX is converted to a digital signal by an A/D converter, and the digital signal is sent to a digital signal processing circuit, where the time-serially transmitted data is stored in a RAM and the data is read from the memory in a different sequence. This is called interleaving. The interleaving is a data distribution processing to allow error correction of the data even if a dropout or burst error occurs in the recorded data. This process is carried out by an interleaver shown in FIG. 1 which is a data delaying and rearranging circuit. The interleaved signals on the input data $L_i$, $R_i - L_{i+15}$ and $R_{i-15}$ are arranged to form an error detection and correction block, and by encoding using error detection and correction code such as the Reed-Solomon code parity words, for example, $Q_0$, $Q_1$, ..., and $Q_7$ or $P_0$ and $P_1$ are produced. The signals processed in this manner are recorded on the magnetic tape by a multi-head (20-track head, for example) through recording amplifiers. In the reproducing operation, the signals read from the magnetic tape by the multi-head are amplified and reshaped by reproducing pre-amplifiers, outputs of which are sent to a reproducing digital signal processing circuit, in which the input data is arranged to form the error detection and correction block. After the detection and correction of the data error, the data having the sequence thereof changed by the interleaving is rearranged in the original sequence by a de-interleaver. This is called de-interleave processing. The de-interleaved digital signal is converted to an analog signal by a D/A converter, and the analog signal is divided into left and right channels by a demultiplexor to reproduce the two-channel audio signals $L_{out}$ and $R_{out}$.

Figure 1:
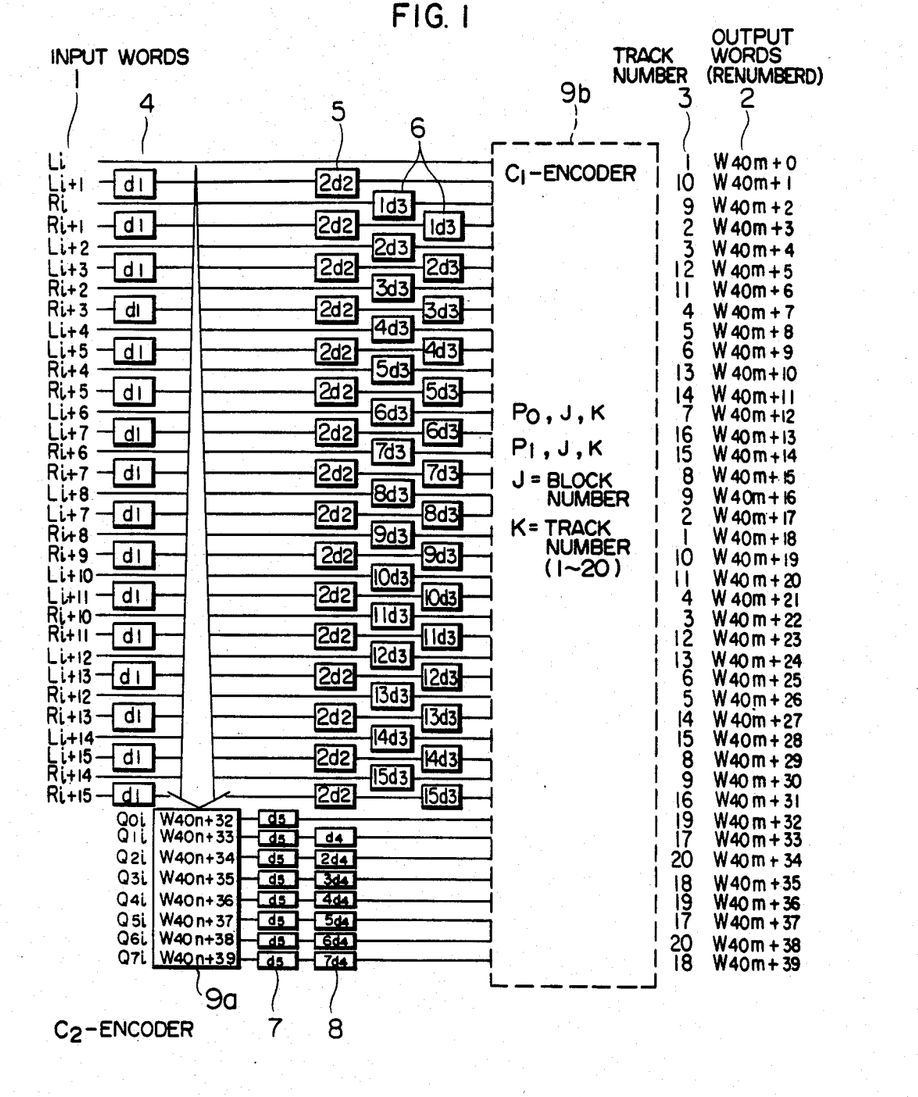
FIG. 1 is a block diagram of one embodiment of an interleave circuit including an error correction encoding circuit of the present invention.

Referring to FIG. 1, one embodiment of the present invention is explained. FIG. 1 shows an interleave circuit for interleaving the data in the record mode. Numeral 1 denotes uninterleaved data, numeral 2 denotes interleaved data, numeral 3 denotes a track number on a tape on which the interleaved data is recorded, numerals 4-8 denote data delay circuits, and numerals 9a and 9b denote a $C_2$-parity encoder and a $C_1$-parity encoder which use a doublyencoded error correction code. An example for contructing such encoders is disclosed in Odaka et al U.S. Pat. No. 4,413,340. PCM data to be recorded on the tape is distributed to 20 tracks. Accordingly, the interleaving process must take the data delay in the tape transport direction and the distribution of the data among the tracks into consideration. In the interleave circuit of FIG. 1, the data is delayed by the delay circuits 4-8 and then the data is distributed to the tracks as shown by numeral 3. After the sampling of the L and R channel audio signals, the A/D converted L - R two-channel PCM signal 1 is delayed by the delay circuit 4 only for the odd data, and the error correction code generator 9a which may use the Reed-Solomon code carries out the $C_2$-encoding by the Reed-Solomon code for the 32-word data (40, 32, 9) and adds parities $Q_{0i}$, $Q_{1i}$, ..., $Q_{7i}$. A delay $d_1$ by the delay circuit 4 may change from data to data. In this manner, the $C_2$-parity encoder is constructed. The data delayed in the delay circuit 4 and the parities generated by the error correction code generator 9a are further delayed, that is, interleaved for each word by the delay circuits 5-8. The Reed-solomon code encoding ($C_1$-encoding) is carried out for the 27 words of control signal words and data words of one block or $C_2$ parity words by the $C_1$-encoder 9b (29, 27, 3) to produce $C_1$ parity words $P_{o,j,k}$ and $P_{i,j,k}$, and it is recorded in the tracks shown by 3.

Figure 3:
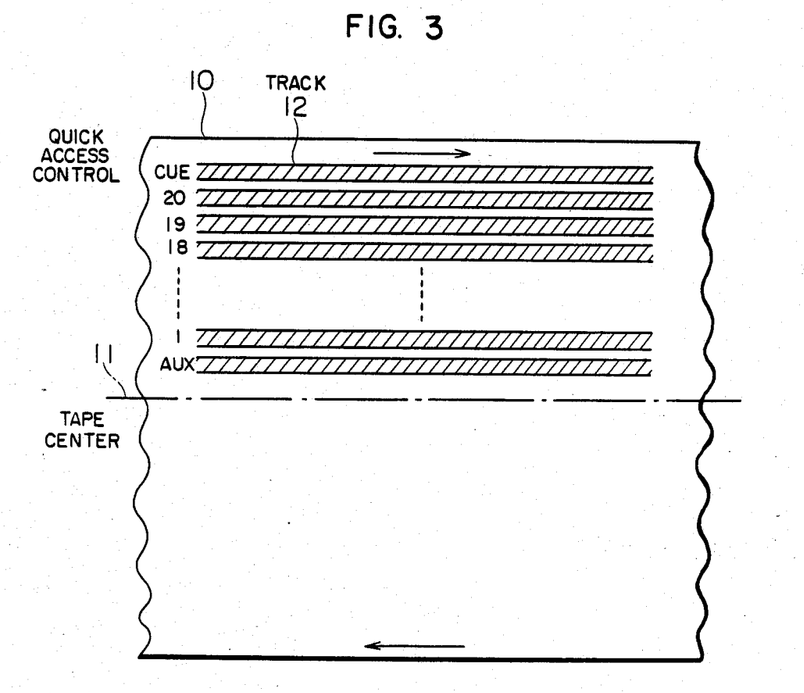
FIG. 3 illustrates a track pattern on a tape used in the present invention.

FIG. 3 shows a record track pattern on the tape. Numeral 10 denotes a magnetic tape, numeral 11 denotes a center of the tape and numeral 12 denotes a record track. The record track comprises 22 tracks, that is, 20 tracks for recording 20 PCM signals, an AUX track for recording an auxiliary signal other than the PCM signal, and a CUE track for recording a fast access control signal. The track width may be 65 $\mu$m and a track pitch may be 80 $\mu$m. The 22 tracks are arranged in one half widthwise area of the tape. The remaining half area is used to record signals when the tape is transported in the opposite direction. In this manner, reciprocal recording and reproducing is attained. In the following description, only the 20 tracks for recording the PCM signals are explained.

Figure 4A:
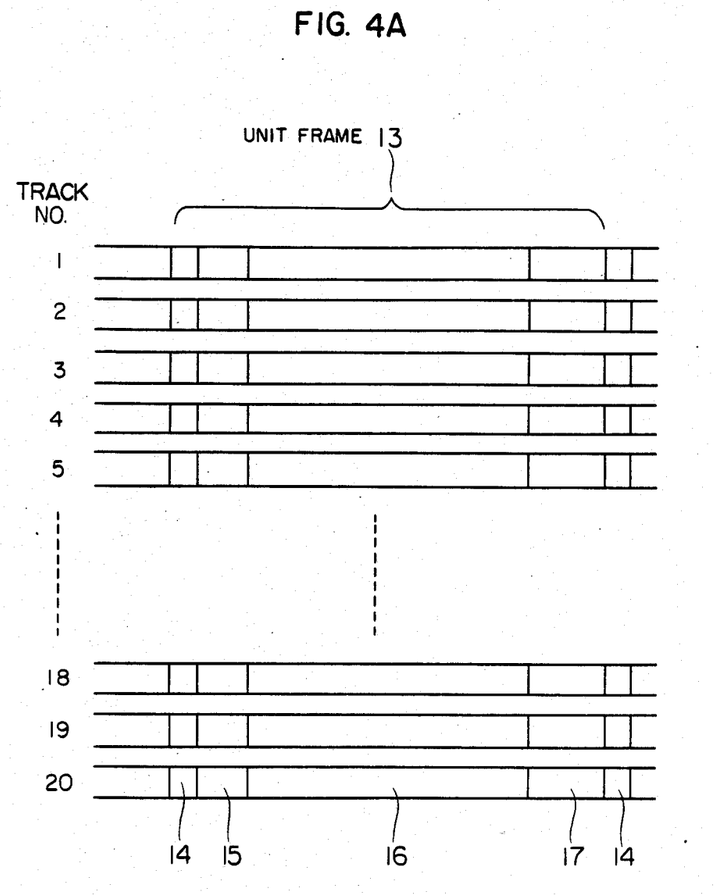
FIGS. 4A to 4C show a track frame format used in the present invention, detail of the frame format and a block diagram, respectively.
Figure 4B:
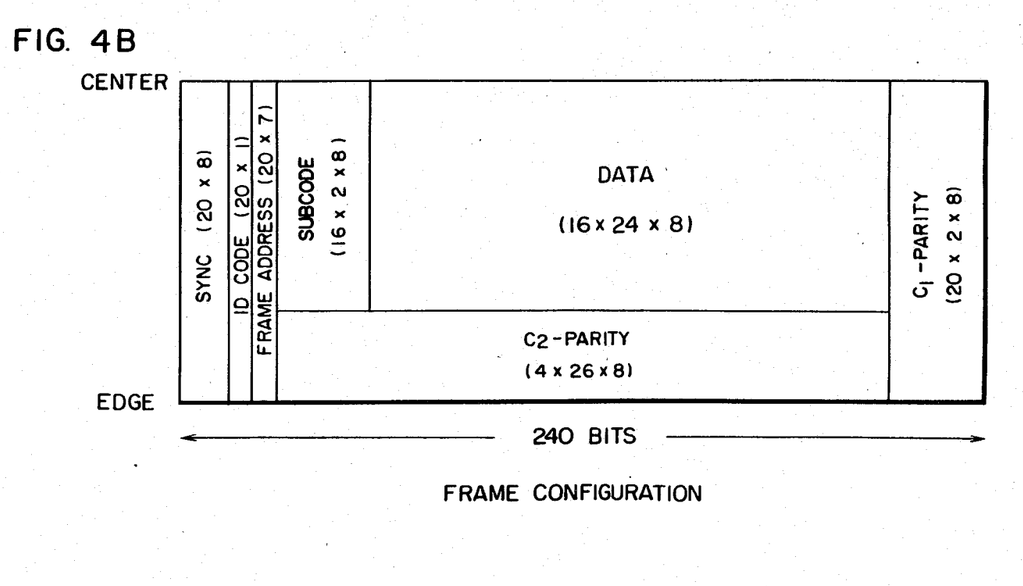
Figure 4C:
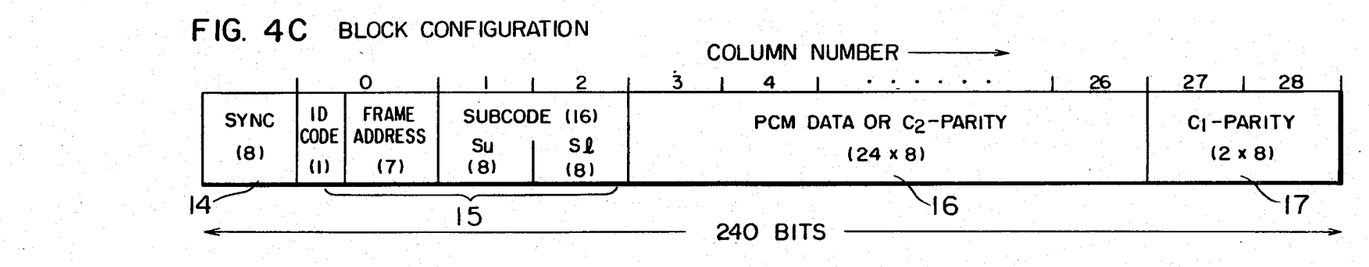
Figure 5:
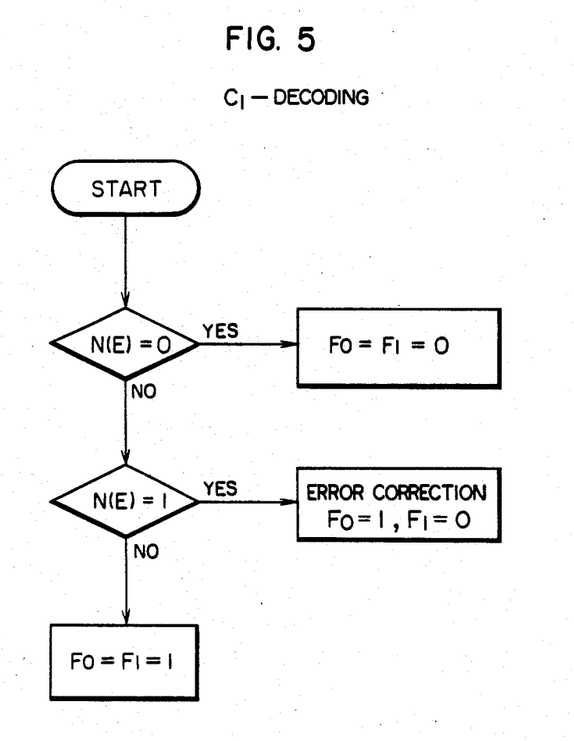
FIG. 5 is a flow chart illustrating an error correction algorithm.
Figure 6:
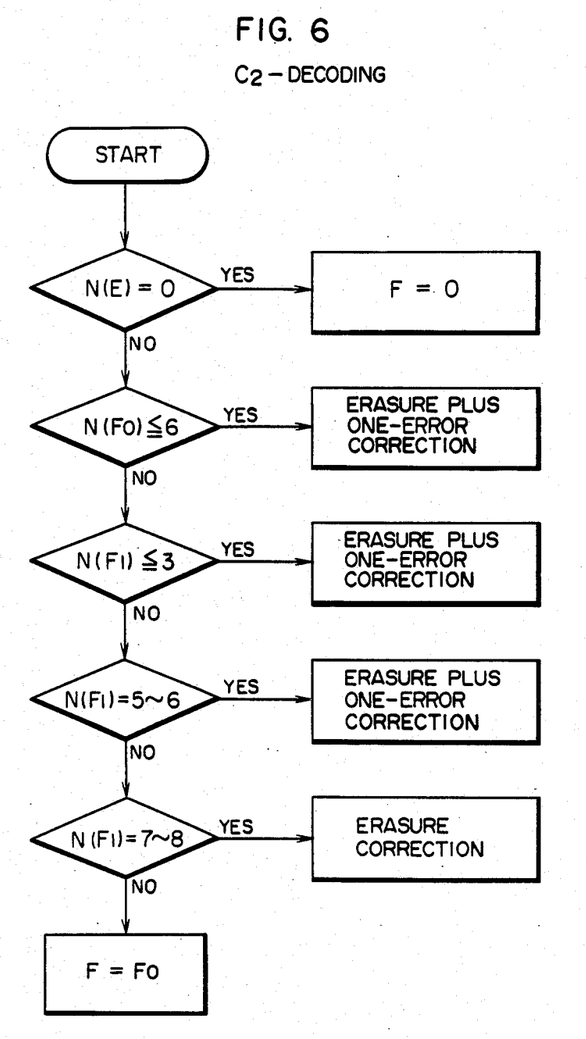
FIG. 6 is a flow chart illustrating another error correction algorithm.

FIGS. 4A, 4B and 4C show a frame format of the track on which the PCM signal is recorded, a data record format in a field, and a block configuration. Numeral 13 denotes a frame, numeral 14 denotes a one-byte synchronization signal, numeral 15 denotes a three-byte control signal including a one-bit ID code, a 7-bit frame address and information (16-bit sub-code) relating to the PCM signal, numeral 16 denotes the 24-byte PCM signal, and numeral 17 denotes an error detection and correction code ($C_1$-parity word) added to each 2-byte block. One track of data in one frame thus constructed is defined as one block which includes 240 bits (FIG. 4C). One frame comprises 20 blocks. In each block area for PCM signal 16, the interleaved data 2 shown in FIG. 1 is recorded. After the addition of the parities by the error correction code generator 9a and the delay of the data by the delay circuits 4-8, the $C_1$-parity word 17 is further added to each block by the $C_1$-parity encoder 9b. By doubly encoding the data by the interleaving, a high error detection and correction capability is attained with relatively simple code arrangement and decoding algorithm. Examples of the decoding algorithm for the Reed-Solomon code ($C_2$) having a code length of 40, the number of information words of 32 and a minimum distance of 9, as the code generated by the error correction code generator 9a, and Reed-Solomon code ($C_1$) in circuit 9b having a code length of 29, information words of 27 and a minimum distance of 3 are shown in FIGS. 5 and 6. FIG. 5 shows the algorithm of the first error detection and correction ($C_1$-encoding) for each block. N(E) denotes the number of errors detected. If one error is corrected and a further error is detected, a flag $F_0$ is set to "1", and if two or more errors are detected and are not correctable, a flag $F_1$ is set to "1". By utilizing the flags $F_0$ and $F_1$, the error is detected and corrected by the second error detection and correction algorithm ($C_2$-decoding) for the Reed-Solomon code having a minimum distance of 9. FIG. 6 shows the error detection and correction algorithm. N ($F_0$) and N ($F_1$) denote the numbers of flags $F_0$ and flags $F_1$. Erasure correction, erasure and one-error correction or erasure and two-error correction is carried out depending on the number of flags. For the erasure for which the error location is known, a word having the flag $F_0$ or $F_1$ added thereto is used. F denotes an incorrectable flag which is added when the error is incorrectable. When $F = F_0$, the flag $F_0$ is used as the incorrectable flag. When the error is incorrectable, the flag $F_0$ is used as the incorrectable flag. When N ($F_0 \leq 6$, all words are incorrectable. In the algorithms shown in FIGS. 5 and 6, a probability of incorrectability to the random error is approximately $6 \times 10^{30} \cdot P_s^{18}$ where $P_s$ is an error rate per symbol unit. When $P_s = 10^{-3}$, the probability of incorrectability is $6 \times 10^{-24}$. Thus, a high correction capability is attained by a relatively simple correction. By the combination of the Reed-Solomon code having a high random error correction capability and the interleaving which converts the burst error to the random error, the correction capability to the burst error is enhanced. A technique to enhance an error correction capability in decoding the doubly-encoded error correction code is described in U.S. patent application Ser. No. 665,378 by Okamoto et al, entitled "Decoding Method and System for Doubly-Encoded Read-Solomon Codes", filed on Oct. 26, 1984 based on Japanese Patent Application No. 58-202602 filed in Japan on Oct. 31, 1984, and included herein by reference.

Figure 7:
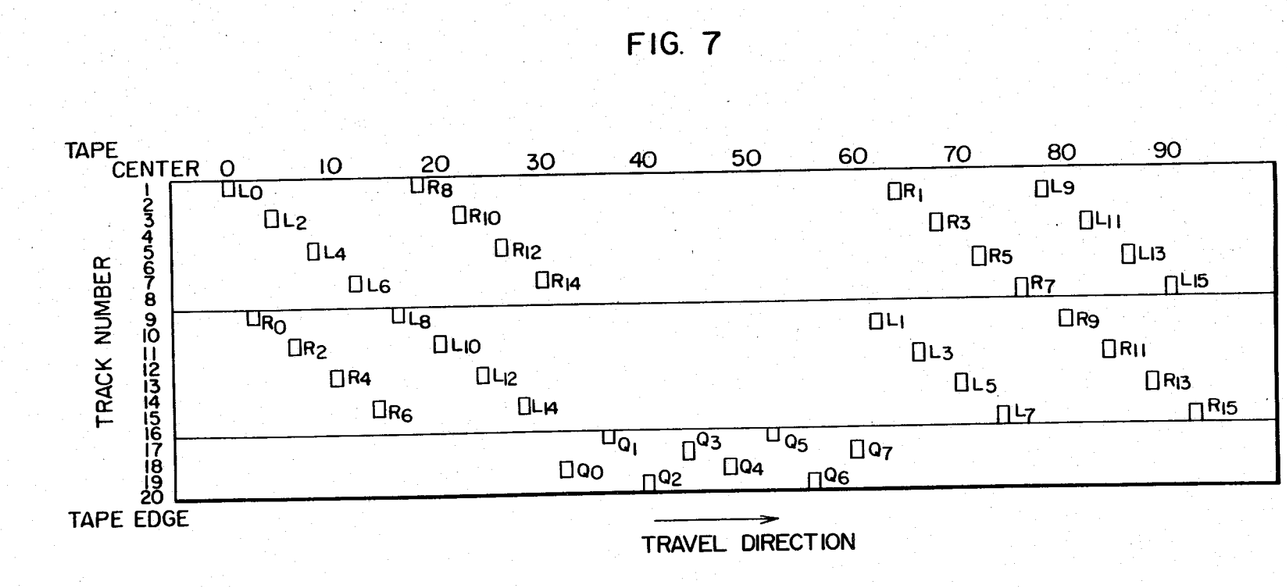
FIG. 7 shows a record pattern corresponding to the embodiment of FIG. 1.

FIG. 7 shows a data record pattern on the magnetic tape recorded in the present embodiment. One section corresponds to one block delays of data are $d_1 = 0$, $d_2 = 30$ frames, $d_3 = 2$ frames, $d_4 = 4$ frames and $d_5 = 32$ frames. Those values allow the interleave delay by a commercially available 256K-bit RAM.

In the record pattern shown in FIG. 7, the L-channel and R-channel even data ($L_0$, $R_8$), $L_2$, $R_{10}$) ... ($R_6$, $L_{14}$) or odd data ($R_1$, $L_9$), ($R_3$, $L_{11}$), ... ($L_7$, $R_{15}$) are arranged on each of the first to sixteenth tracks except the edge tracks, and parity data (words) ($Q_1$, $Q_5$), ($Q_3$, $Q_7$), ($Q_0$, $Q_4$), ($Q_2$, $Q_6$) are arranged on the seventeenth to twentieth tracks on the edges of the tape. In the reproducing mode, one block is constructed by those data. The odd data and the even data are spaced by 30 block length in the tape transport direction so that they are completely separated. In this separation area, the parity data ($Q_0$–$Q_7$) which are selectively delayed are obliquely and dispersely arranged with respect to the track. The data is also selectively delayed and obliquely distributed with respect to the track. In order to enhance the error correction capability to the burst error in the track width direction (widthwise of the tape), the first half of the even data ($L_0$, $L_2$, $L_4$, $L_6$) and the record half of the odd data ($L_9$, $L_{11}$, $L_{13}$, $L_{15}$) are distributed in the first to eighth tracks in the center of the tape, and the second half of the even data ($L_8$, $L_{10}$, $L_{12}$, $L_{14}$) and the first half of the odd data ($L_1$, $L_3$, $L_5$, $L_7$) are distributed in the nineth to sixteenth tracks on the edge of the tape. The right channel sample data $R_0$–$R_{15}$ are distributed symmetrically to $L_0$–$L_{15}$ with respect to the tracks of those two groups. The distance between the sample data which are adjacent to each other in the original time sequence, for example, the distance between the even data $L_0$ and the odd data $L_1$ after the separation can be adjusted by the distribution of the parity data $Q_0$–$Q_7$. Accordingly, the adjustment for the audio data is not necessary.

Figure 8:
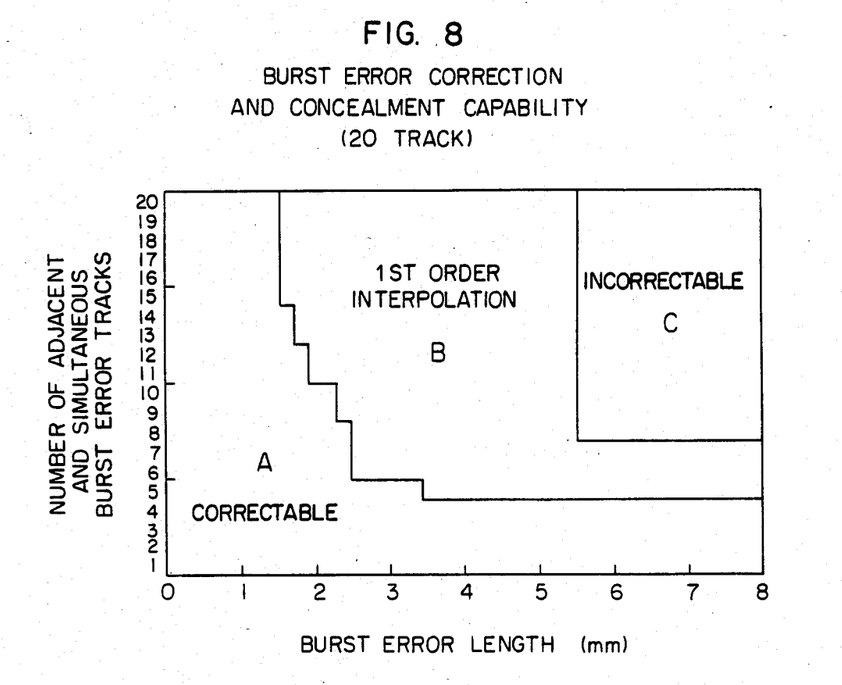
FIG. 8 illustrates a burst error correction capability in the embodiment of FIG. 1.

FIG. 8 illustrates the burst error correction capability for the 20 tracks. An ordinate represents the number of occurrence of burst errors, an abscissa represents a burst error length (in mm), an area A represents a correctable area, an area B represents a first order interpolation (i.e. concealment) area and an area C represents an incorrectable area on correction and concealment.

A two-dimension interleave method in which a series of data is obliquely distributed at a constant pitch with respect to the tape transport direction is disclosed in the above-mentioned patent application by Hoshino et al.

In setting the pattern, defects in the tape transport direction and the tape width direction and abnormal output due to the defect of the head or the deposition of dust were studied with respect to the record error on the tape and the defects of the tape and it was proved that the above data allocation, particularly the distribution in the tape transport direction is effective to suppress the error. In the present embodiment, the L-channel data and the R-channel data are recorded in each track so that the burst error in a specific track is distributed to both channels. The parities are arranged in the tracks near the tape edge having a low error rate and the PCM signals are recorded in the inner tracks so that a probability or error of the PCM signals is reduced. The odd data and the even data are separated and the adjacent data, for example, the data $L_0$ and $L_1$ are arranged to be spaced as much as possible in the tape transport direction and the tape width direction so that the error correction capability to the burst error is enhanced.

When the above error correction method is applied in the embodiment of FIG. 7, all track errors in seven frames or burst errors in four tracks can be corrected. When an error correction method by an average interpolation is used, all track errors in 57 frames or burst errors in seven tracks can be interpolated (FIG. 8). In FIG. 7, $d_1$ is set to 0. By making a delay in $d_1$, the correction capability is further enhanced.

Figure 9:
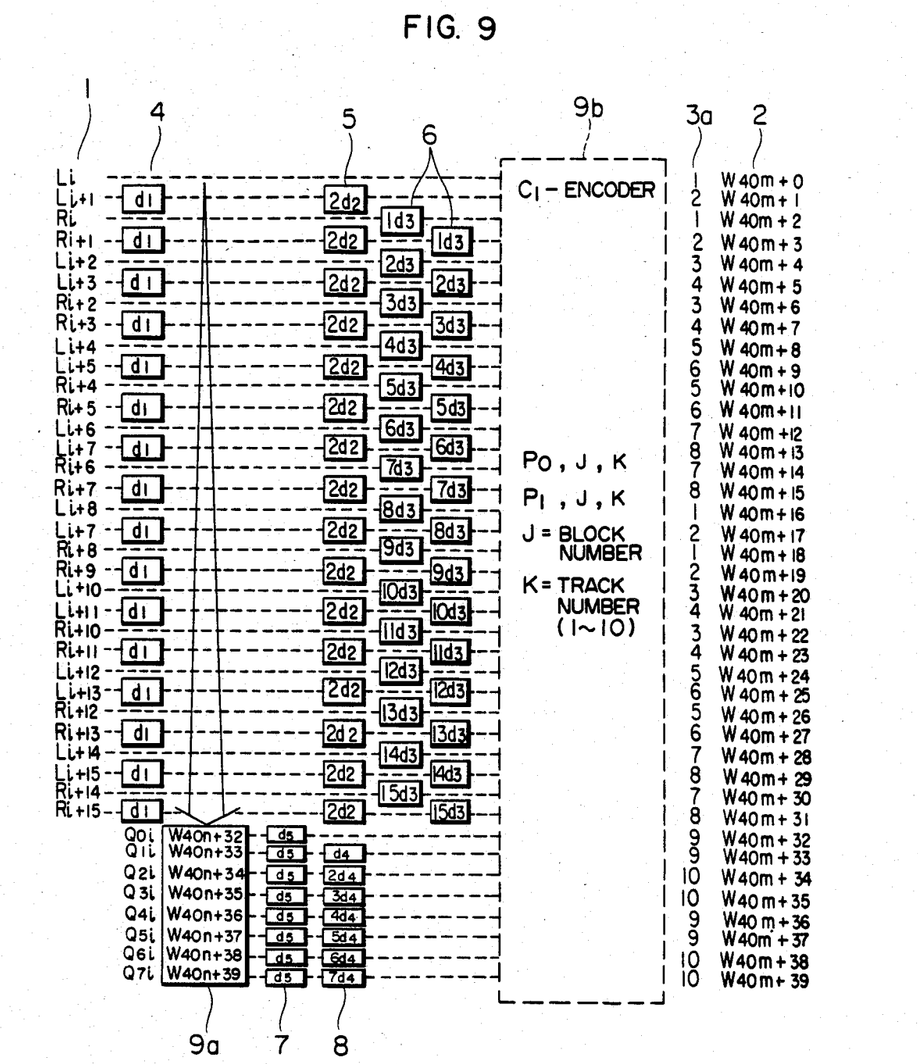
FIG. 9 is a block diagram of another embodiment of the interleave circuit.
Figure 10:
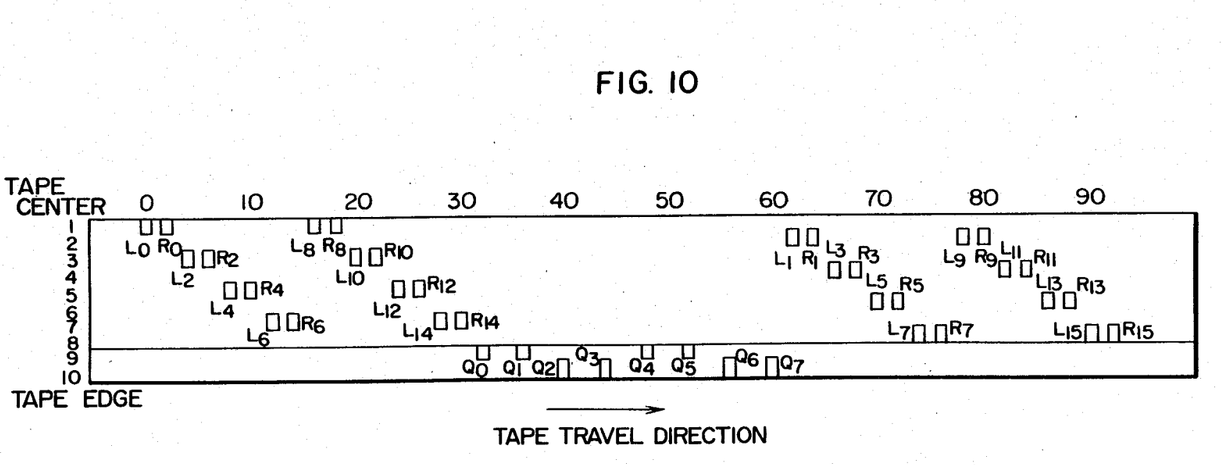
FIG. 10 shows a record pattern corresponding to the embodiment of FIG. 9.

FIG. 9 shows other embodiment of the present invention for a 10-track record. The only difference from FIG. 1 is the track distribution means 39. In the present data distribution method for the ten tracks, the even data is arranged on the odd tracks and the odd data is arranged on the even tracks. FIG. 10 shows a record pattern on the tape in the embodiment of FIG. 9. The delays are equal to those shown in FIG. 7. The interleave method of the present invention can be applied to the ten-track record without reducing the error correction capability by merely changing the track distribution means.

We claim:

1. In a stationary multi-track head type PCM recorder having an A/D converter for sampling an analog signal and converting the analog signal to a digital signal, a signal processing circuit including data delay and encoder means for adding parity words and a predetermined signal to said digital signal of each of a predetermined number of samples to form a frame for error detection and correction, and multi-track heads for recording an output of said signal processing circuit on a plurality of tracks of a recording tape in parallel in a tape transport direction and reproducing the signals recorded on the recording tape;

a digital signal recording method for reducing incorrectability of said error detection and correction code for a burst error in the output analog signal due to a burst error in the reproduced output, comprising the steps of:

delaying parity words derived from said frame for error detection and correction and said digital signal data by different delay times such that said digital signal data is distributedly recorded on said plurality of tracks in a track-width direction and the tape transport direction and the data of adjacent sample points which are consecutive in original time sequence are separated from each other into first and second groups in areas spaced in the tape transport direction in each error detection and correction frame, while said parity words are distributed in a third group in an area between the spaced first and second groups; and allotting the delayed data to said multi-track heads such that the data of said first and second group areas are located on center-side tracks of the recording tape and the parity words in said third group area are located on edge-side tracks of the recording tape.

2. A digital signal recording method according to claim 1 wherein the analog signal is sampled from first and second channels, the sample data is spaced on the first half and the second half of the data tracks in the track-width direction, respectively, and the first channel sample data and the second channel sample data are spaced from each other in the track-length direction, and the first and second channels are spaced in the opposite relation between the distributed adjacent data groups.

3. A digital signal recording method according to claim 1 wherein the analog signal is sampled from first and second channels, and the first and second channel sample data are recorded on each track.

4. A digital signal recording method according to claim 1 wherein said digital signal data is sampled from first and second channel audio signals, and said delaying step includes a step for imparting a large delay to the correction group of one of the first and second channel sample signals such that the odd data and the even data are separated from each other in the tape transport direction by at least a total distribution length of said third group along the tape transport direction.

5. A digital signal recording method according to claim 4 wherein a first half of the even data and a second half of the odd data of the first channel, and a second half of the even data and a first half of the odd data of the second channel are recorded in the center tracks of the plurality of signal data record tracks, and the latter half of the even data and the first half of the first channel and the first half of the even data and the second half of the odd data of the second channel are recorded in the edge tracks.

6. A digital signal recording method according to claim 4 wherein said data allotting step allots the such that the even data of the first and second channels is arranged on the odd tracks and the odd data is arranged in the even tracks and the first and second channel data is included in each track.

7. The method according to claim 1, wherein said parity words are generated by using a Reed-Solomon code.

8. A stationary multi-track head type PCM recorder having and A/D converter for sampling an analog signal and converting the analog signal to a digital signal, a signal processing circuit including data delay and encoder means for adding parity words and a predetermined signal to said digital signal of each predetermined number of samples to form a frame for error detection and correction, and multi-track heads for recording an output of said signal processing circuit on a plurality of tracks of a recording tape in parallel in a tape-transport direction and reproducing the signals recorded on the recording tape, said signal processing circuit comprising:

means for delaying parity words derived from said error detection and correction frame and said digital signal data by different delay times such that said digital signal data is distributedly recorded on said plurality of tracks in the track-width direction and the tape transport direction and for separating the data of adjacent sample points which are consecutive in original time sequence into first and second groups in areas spaced in the tape transport direction in each error detection and correction frame, while said parity words are distributed in a third group in an area between the spaced first and second groups; and means for allotting the delayed data to said multi-track heads such that the data of said first and second group areas are located on center-side tracks of the recording tape and the parity words in said third group area are located on edge-side tracks of the recording tape;

whereby the incorrectability of said error detection and correction code for a burst error in the output analog signal due to a burst error in a reproduced output is reduced.

9. A PCM recorder according to claim 8, wherein said signal processing circuit includes means for generating said parity words using a Reed-Solomon code.

* * * * *